March 18, 1952  H. F. ROST ET AL  2,589,965
SYSTEM FOR LOCATING, INDICATING, AND/OR
FOLLOWING OBJECTS IN SPACE
Filed June 7, 1946  6 Sheets-Sheet 1

Helge Fabian Rost
Karl Harry Thunell
Sten Daniel Vigren
Per Harry Elias Claesson
INVENTORS

Fig. 2

Helge Fabian Rost
Karl Harry Thunell
Sten Daniel Vigren
Per Harry Elias Claesson
INVENTORS

Fig. 7.

INVENTORS
HELGE FABIAN ROST
KARL HARRY THUNELL
STEN DANIEL VIGREN
PER HARRY ELIAS CLAESSON

By Richardson, David and Norden
their ATT'YS.

Patented Mar. 18, 1952

2,589,965

UNITED STATES PATENT OFFICE 2,589,965

SYSTEM FOR LOCATING, INDICATING, AND/OR FOLLOWING OBJECTS IN SPACE

Helge Fabian Rost, Djursholm, Karl Harry Thunell, Nockeby, Sten Daniel Vigren, Stockholm, and Per Harry Elias Claesson, Jakobsberg, Sweden Application June 7, 1946, Serial No. 674,972
In Sweden January 10, 1940

Section 1, Public Law 690, August 8, 1946
Patent expires January 10, 1960

14 Claims. (Cl. 343—7)

The present invention generally relates to systems for locating, indicating and/or following objects in space, this patent application being a continuation in part of our patent application Ser. No. 377,344, filed February 4, 1941, now Patent No. 2,409,448, issued October 15, 1946.

The invention is particularly suitable for antiaircraft defense, no matter if said aircrafts are visible from the place of observation or not, in the latter case, for example, when one or more aircrafts are flying above the clouds or in the dark or behind smoke screens.

The invention is also suitable for use on vessels at sea to spot objects on land, at sea or in the air.

The invention is also suitable to act as an antiaircraft alarm for remote indication at a central fire control command.

According to the present invention direction and distances of objects in space, which are invisible to an observer, can immediately, automatically and continuously be indicated or observed, as if the objects in reality were visible.

The invention according to its general scope can be put to a multitude of different uses, of which the following application to antiaircraft defense is but one example, which will be described hereafter.

For air defense the main object of the invention is to rapidly locate enemy aircraft and to simultaneously prepare and direct the antiaircraft guns against such aircraft.

Heretofore many expensive instruments have been necessary for each antiaircraft battery, such as detectors, sound-lag correctors, position comparators, searchlights and a lot of transmission and remote control systems, which instruments are used at night apart from the following for artillery normal instruments: Range and direction finders, instruments for the measuring of angle of elevation, side angle, instruments for measuring of the velocities of said angles and also the accelerations of the same angles, several of which instruments are included in a complicated central control instrument.

Heretofore, airplanes and other aircrafts were spotted by means of a sound locator arranged to listen to the motor or propeller sound emitted from an aircraft. Its greatest range under favourable conditions is about 10 kilometers. At normal velocities, for example at 360 km./hour, a bombing plane will travel a great part of said distance before the sound is noticed at the sound locator and same is adjusted for sure following of the target. When we further consider the time required for adjustment of the sound lag corrector, of the position comparator, the aiming of the search light, lighting same and searching for the target, it will be clear that there remain but a few seconds to obtain distance measurements and for firing and aiming the guns.

Valuable time is thus lost in operating and adjusting all these instruments and the antiaircraft artillery often has not even time to fire a single shot at the attacking air forces.

Much valuable time is saved by the present invention and the whole antiaircraft defense can be considerably simplified and cheapened. On the same time the efficiency of the air defense will be considerably increased.

According to the present invention a general locating device is used which makes possible the direct observation of targets by means of light spots on fluorescent screens, for instance, on which the battery commander can simultaneously observe the distances and side and elevation angles of the objects in the air with respect to the place of observation. This observation is independent of the weather, of clouds, smoke screens and the like and can equally well be made at night as in day time.

Such a device causes no appreciable time delay and as soon an aircraft comes within the field of action of the device, the aircraft can continuously be observed with respect to direction as well as to distance.

An object of the invention is to rapidly locate objects in space, whereby the receiving means rotatable in at least one plane comprises an antenna device of sharp directional character, and whereby said antenna device and receiving means are adapted to scan in strictly diverging directions and to successively receive reflected radio energy from two substantially adjacent parts of a common field of search, in order to rapidly indicate the existence of objects within the respective parts of the said common field of search, so that in spite of the sharp directional character of the receiving means a relatively large common field of search can be surveyed without simultaneously rotating the receiving means.

Another object of the invention is to rapidly locate flying machines in space, whereby the transmitting and receiving means comprise devices for transmitting and receiving radio waves directed along but a narrow curtain of substantial extension in space, for example a flat or fanshaped wave curtain, which is caused to rotate by rotating the transmitting and receiving means in preferably a single plane. The width of the wave-curtain is so adjusted with respect to the speed of the transmitting and receiving means and with respect to the maximum velocity of the flying machine, that said machines cannot pass a distance corresponding to the width of the wave-curtain during the time involved between two succeeding surveys of the sky.

The lowest part of the wave-curtain should form an angle with the horizontal plane, so that the upper and lower limiting lines of the wave-curtain upon rotation may form surfaces of cones or parts thereof, the tip of which cone will be located at the transmitter.

Another object of the invention is a system for automatically indicating at a remote central place airplanes flying over a surface of land and/or sea, which surface is divided in a plurality of zones, each zone comprising rotatable transmitting and receiving means, driving means for rotating said transmitting and receiving means in at least one plane, directing means for rotating transmitting and receiving means for systematically searching for airplanes in space, an electric operating device coupled to said receiving means and adapted upon receipt of radio energy to connect a long distance line to a low frequency current source, an indicating device located at said central place; said long distance line can normally be used for other services. In this manner an airplane flying over the different zones can be traced at said central place, whereby lighting of lamps on a map representing the different zones can be obtained.

According to another embodiment of the invention the device can also automatically locate the target, for example an aircraft, and once located the device will closely follow said target so that at every moment its position and distance from the point of observation can be observed and read.

By synchronous drive between the device and the guns of a battery, provided the necessary corrections of the shooting elements are made, the locating device and guns can be made to follow each other in such a way that with the necessary ahead-aiming correction depending upon the speed of the target, a perfect hit of the target can be made. The artillery men have thus only to set the time fuse of the projectiles to make them explode at the predetermined range.

The invention will be readily understood on reference to the accompanying drawings, in which.

Figure 1:
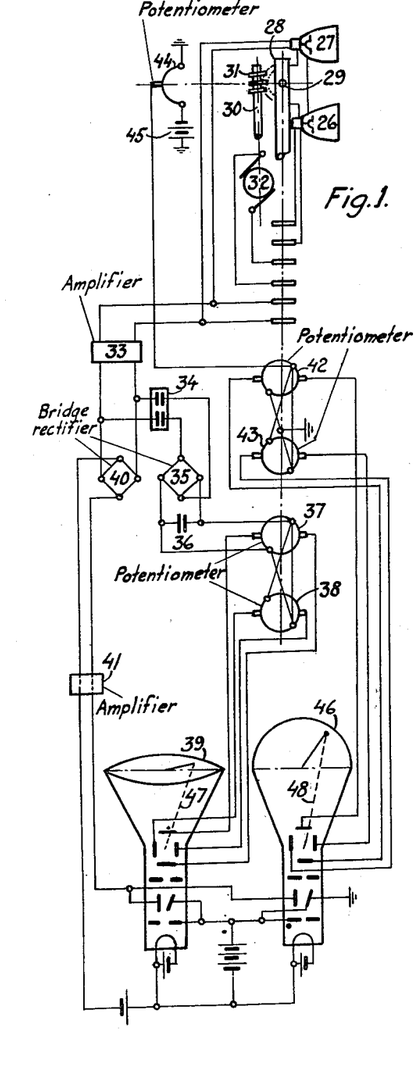
Fig. 1 diagrammatically shows an auxiliary apparatus for locating aircrafts, whereby distance and side angle to the target can be observed on a fluorescent screen, while on another screen the elevation and side angle to the same target can be observed.

In Fig. 1 element 26 is a transmitter for directed ultrashort radio waves. Element 27 is a receiver of the same kind. Both transmitter and receiver are rotatable and mounted on a shaft 28 which is driven by a motor (not shown in the drawing). At the same time as the shaft 28 is rotated, the transmitter and the receiver are arranged to turn 90° from horizontal to vertical searching position and vice versa. The rotating takes place around the center pin 29 by means of worm gear 31, shaft 30 and motor 32. The shaft 30 and motor 32 are mounted on shaft 28 in known manner. The whole structure is turned in such a way that the transmitter and the receiver describe a spiral curve so that the whole or part of the sky can be searched. The rapidity of the searching operation depends on the velocity of shaft 28 and the exactness of the pictures that is desired.

By means of collector rings on respective shafts and fixedly arranged contact brushes or vice versa, connection of the integral moving electrical parts of a circuit to stationary parts of the device can be made.

33 is an amplifier for received radio waves. Element 34 is a device comprising, for example, condensers of variable impedance for variable frequencies so that more current is allowed to pass at high frequencies than at low ones. 35 and 40 are respectively rectifying devices. 36 is a condenser. 37—38 and 42—43 are potentiometer or circular resistances fixed on the shaft 28. 41 is an amplifying device connected to the baffle plates of cathode ray tubes 39 and 46. 39 is a cathode ray tube with plane fluorescent screen and 46 is a cathode ray tube with semispherical screen.

The device shown in Fig. 1, which is particularly adapted to locate aircrafts and the like, operates in the following manner. While transmitter and receiver 26 and 27 rotate on shaft 28 they turn on the same time more slowly about pin 29 in a vertical direction and move, for example, from horizontal to vertical position and back to horizontal position. If desired, the vertical movement can be limited to only a certain minor sector. Shaft 28 can also be given a back and forth movement instead of a continuously rotating motion, if only a certain part of the sky is to be observed. The transmitter 26 emits preferably frequency modulated ultrashort and directed radio waves, which in part can be directly received by the receiver 27. If the emitted radio waves encounter on their way, for example an aircraft, they are partly reflected by the same and, as a result, the reflected waves can be received by the receiver 27. A beat frequency is thereby formed between the emitted and the reflected wave, which frequency can be measured and is proportional to the distance.

The obtained beat frequency is amplified in the amplifier 33 whereafter the amplified current is divided one part flowing via the frequency sensitive amplifying device 34 and rectifier 35 to the potentiometer 37 and 38 and the deflecting plates of the cathode ray tube 39.

The other part of the amplified current flows via rectifier 40 and the amplifying device 41 to the baffle plates of cathode ray tubes 39 and 46.

Upon receipt of a reflected wave a deflected electron ray 47 of cathode ray tube 39 will produce a light spot on the fluorescent screen, whereby the distance from the center of said screen is proportional to the distance to the aircraft. The side direction of the latter is directly given with reference to a certain known coordinate system, because, due to the potentiometers 37 and 38 and the deflection plates the corresponding light spot always falls in the same direction towards which the receiver 27 is directed. It should be clear that instead of the potentiometers shown in the drawing any other known device may be used to obtain synchronous movement between cathode ray and the receiver without departing from the scope of the invention.

In order to obtain the elevation and side angles to a certain aircraft, or in order that the battery commander may know at least if an aircraft or other target is situated at the given distance high in the sky or on the horizon, although at the same distance, we use the cathode ray tube 46. Tube 46 is provided with a semispherical fluorescent screen. By means of the potentiometers 42 and 43 connected to the deflection plates of the tube 46, a light spot is obtained showing the side angle of the target or of the receiver 27.

By combining with said potentiometers a potentiometer 44 arranged in combination with the axis or pin 29 the electron ray of tube 46 can be moved so that it will always point in exactly the same direction as the receiver 27.

In certain cases it will be sufficient, if only tube 46 is used for the purpose of obtaining both side and elevation angles, while the distance could at any moment be read on a frequency and distance indicating instrument, which in such a case should be connected instead of the frequency sensitive device 34.

According to a modification of the present invention general orientation with reference to the target can be achieved by using only the spherical tube 46. On the screen of the latter an approximate indication of the distance can be obtained. In such a case tube 39 and potentiometers 37 and 38 are not needed. The condensers 34 are charged proportionally to the beat frequency when an echo is received.

Figure 2:
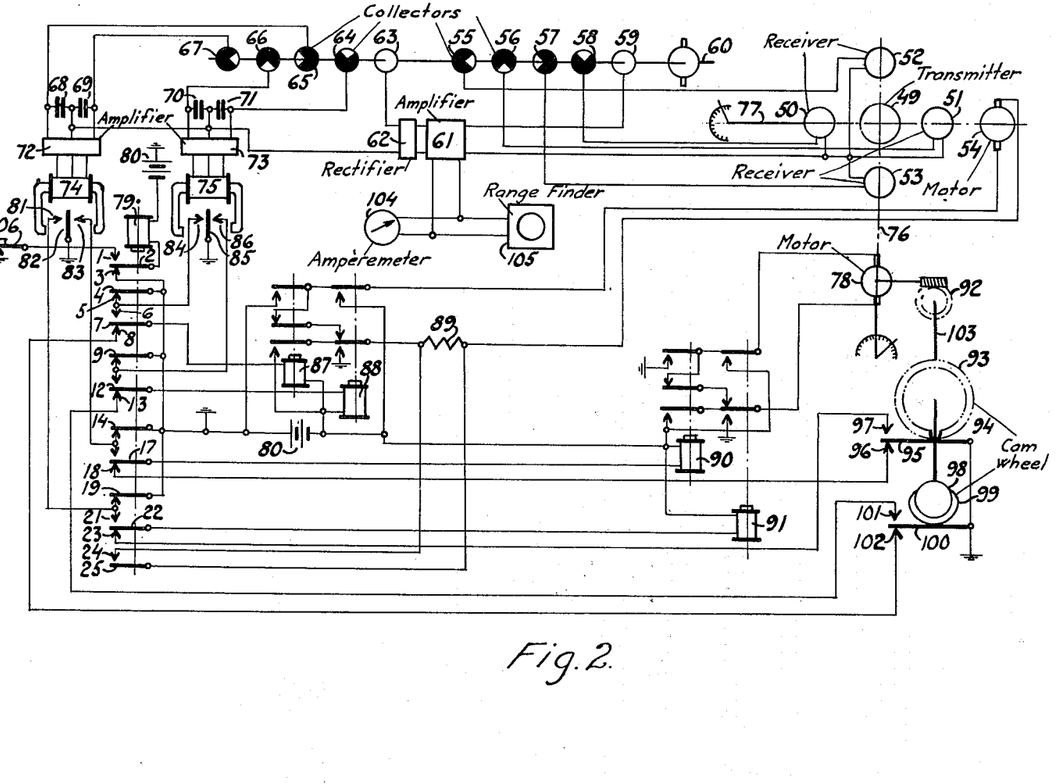
Fig. 2 is a diagram showing an automatic, individual target locating and following device in three dimensions together with instruments for the detection of the exact distance to said target at any moment. The device is provided with one transmitter and four receivers for ultrashort radio waves.

In Fig. 2 element 49 is a directed short wave transmitter, for example a magnetron tube, a klystron or a velocity modulated tube. 50, 51, 52 and 53 are four receivers symmetrically arranged with respect to the transmitter. The transmitter as well as the receivers are arranged to rotate or oscillate about the vertical shaft 76, driven by motor 78. On said shaft there is mounted a horizontal shaft 77, driven by motor 54 about the shaft of which both transmitter and receivers can rotate or oscillate back and forth. In this manner the locator device performs a spiral movement for searching both in horizontal and vertical directions in a manner similar to that described in Fig. 1. When the transmitted wave encounters an object in space, an echo is produced. This echo is received by receivers 50–53, which by means of collector devices 55–59 are successively connected to the amplifier 61, each one during ¼ of a turn of shaft 60.

62 is a rectifier device. 63–67 are partly insulated collector rings transposed ¼ of a revolution with respect to each other and adapted to let current pass to the condensers 68, 69 or 70, 71 at the same moment when the corresponding collector rings 55–59 make their contacts.

The receivers 52 and 53 correspond to condensers 69 and 68 respectively. 72 and 73 are amplifying devices. Elements 74 and 75 are polarized relays, each provided with two windings and contacts 81, 82, 83 and 84, 85, 86 respectively. If condensers 68 and 69 receive equal charges, they discharge equally through the windings of relay 74, but in opposite directions, so that the relay is not actuated. If, however, the target is not located symmetrically with respect to receivers 52 and 53, one condenser will receive more energy than the other. As a result due to discharge through relay windings 74 relay armature 83 will be moved to one side or the other. The same is true with respect to receiver 50 and 51, condensers 71 and 70 respectively and the polarized relay 75.

If thus condensers 68 and 69 thus obtain equal charges through receivers 52, 53 due to reflection of waves from a target it means that each receiver receives an equally large amount of energy reflected from said target. Accordingly the target must be located exactly ahead and symmetrically with respect to transmitter 49 and receivers 52 and 53.

79 is a relay that operates as soon as one of polarized relays 74 or 75 closes one of its contacts. Elements 1 to 25 are contacts controlled by relay 79. Relays 87 and 88 are pole changing relays adapted to turn shaft 77 by means of motor 54 in one direction or the other. Similarly relays 90 and 91 are pole changing relays. Shaft 103 is driven by motor 78 over worm gear 92. On said shaft are mounted contact wheel 93 with cam 94 and contact wheel 98 with cam 99 which cams operate their make contacts 95–97 and 100–102 respectively.

104 is a current intensity indicating device, for example an ampermeter, which serves to indicate when the receivers are pointing directly at the target. 105 is a range finder, for example a precision frequency meter to be read when the target is located exactly in the common axis of the transmitter and the receivers.

106 is a break contact adapted to free the device for searching out another target as soon as the first target is located or shot down.

The device according to Fig. 2, which is intended automatically to locate and follow, for example, an aircraft or group of airplanes operates in the following manner. The device can be used either to search the whole sky, but is preferably limited to searching but a certain section, for instance in the direction from which an attack is expected. In the latter case the device can swing to and fro, up and down a certain number of degrees in each direction. The device is particularly intended to cooperate with an antiaircraft battery for antiaircraft aiming, and the guns of said battery can be arranged to synchronously follow the movements of the searching and following device so that at every moment the guns are aimed at the target with suitable corrections, whether said target is visible or not. In this embodiment of the invention the shaft 76 is, for example, adapted to make half a swing in one second, while shaft 77 performs a turn in 5 seconds. These movements can be directed by cam wheels 93 and 99, which emit electric impulses to relays 90 and 91 and relays 87 and 88 respectively. When said relays are alternatingly operated, the current to motors 78 and 54, respectively, is changed so that oscillatory movements are obtained.

When an object enters within the field of action of the transmitter and the receivers, one of the polarized relays 74 or 75 is operated, whereby relay 79 also is operated and receives holding current over the following circuit: Battery 80, relay 79, its contact 2—3 and 4—5, contact 84 and armature 85 of relay 75, ground.

Thereupon, the oscillatory movements and searching cease and after the actuation of relay 79 the device is connected for manual or automatic following operation of the now located target. If the located target is not exactly in the center of the field of action of the four receivers, the polarized relay 74, for example operates and its armature 83 makes contact with contact 81. The following circuit is closed: Ground, contact 83—81, contact 21—22 of relay 79, relay 91, battery 80. Relay 91 is thus operated and motor 78 receives current and rotates in a certain direction.

On the other hand, if the polarized relay 74 closes its contact 82—83, relay 90 is operated instead and motor 78 receives oppositely directed current until the target is encountered directly in the axis of the four receivers. When this condition is reached the armature of relay 74 returns to its normal position and relay 90 is de-energized. The rotor of motor 78 is thereby short-circuited and immediately stops. In similar manner the polarized relay 75, relays 87, 88 and motor 54 are operated. The short-circuit of motors 54 and 78 takes place over break contacts in relays 87, 88 and relays 90, 91 respectively, when said relays are in non-operated positions. When the antenna means are directed exactly on the object, the corresponding relays 87, 88 and 90, 91 are released, whereby the said short-circuit of the respective motors in known manner acts as a brake, so that the corresponding motor stops. As soon as the target changes its course, the respective relays are put in play, so that the target will be steadily located exactly in the common axis of the receivers. By means of graduated scales on shafts 76 and 77 or by remote control devices, the elevation and side angles can at any moment be observed and read, or the guns of the battery can be synchronously driven, the necessary shooting elements being made to compensate for wind, time delays, etc., so that the guns will always be in position for a perfect hit.

Range finder 105 supplies the necessary data for setting the time fuse of the projectiles.

The present invention wastes no time, and the guns are always ready to be fired at a target, whether same is visible or not. Besides, the present invention eliminates the expensive instruments for optical range finding, sound locator, instruments for measuring of side and elevation angles, velocities, side and elevation accelerations, as well as searchlights.

Figures 3, 5:
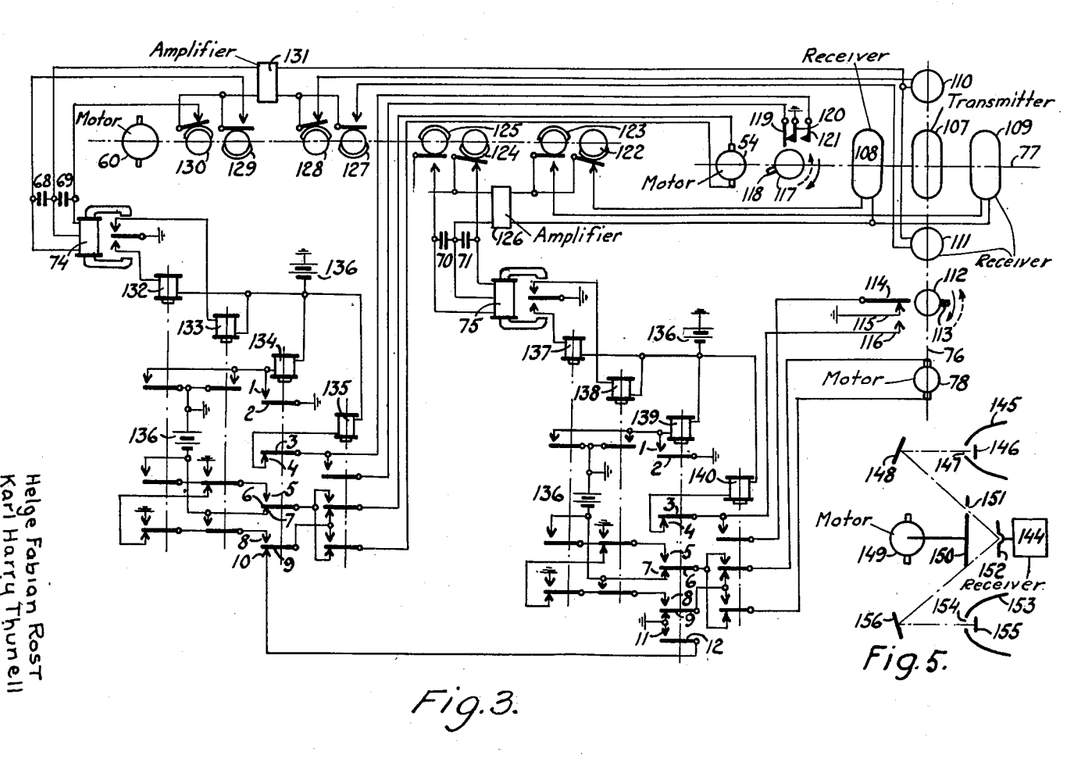
Fig. 3 is a diagram showing a target locating device arranged to send out a flat curtain of radio waves and including four receivers.
Fig. 5 illustrates a modification of the device according to Fig. 2 comprising one receiver and two paraboloidal reflectors or the like to receive reflected radio waves.

In Fig. 3 element 107 is an ultrashort wave radio transmitter adapted to emit radio waves directed in, for example, a vertical plane. 108 and 109 are receivers that can receive reflected waves in a vertical plane. 110 and 111 are receivers symmetrically and diagonally placed with respect to the other receivers 108 and 109, and that can receive reflected ultrashort waves of circular or point shape. The transmitter and the receivers are rotatably arranged around the vertical shaft 76 by means of motor 78. Said transmitter and receivers are also turnably arranged around the horizontal shaft 77 by means of motor 54.

This embodiment of the invention is preferably intended to patrol a certain limited part of the sky, for instance a sector where an enemy attack can be expected. The transmitter 107 and the receivers 108 and 109 can thus patrol, for example, a 30° broad belt by allowing the vertical shaft 76 to rotate or by allowing it to oscillate to and fro over a section or a certain part of the front. In the construction shown in Fig. 3, 112 is a cam wheel with cam 113 on shaft 76. If the shaft 76 rotates to the left, the cam 113 presses the spring 114 and makes contact with springs 115 and 116. Relay 140 is thus operated and current to motor 78 is reversed so that the motor rotates in the other direction until cam 113 meets spring 114 from below and thereby interrupts the current to relay 140. The current is then again reversed to the motor 78 and so forth.

As soon as an aircraft meets the waves emitted from transmitter 107 and waves are reflected and received by receiver 108 or 109, the polarized relay 75 is operated in the same manner as previously described in connection with Fig. 2. Relay 137 or relay 138 are thus operated, whereby a circuit is closed causing relay 139 to operate and obtain holding current. The circuit of relay 140 is then interrupted so that said relay can no longer operate and remains without current. Motor 78 now continues to rotate in one or the other direction as long as relay 75 is operated in one direction or the other. When the aircraft is located directly in front of the transmitter 107 and receivers 108 and 109, the rotor is short-circuited and the motor stops.

The short-circuit of motor 78 takes place, for example in the following manner. If the armature of the polarized relay 75 is making contact with its upper contact, relay 138 and relay 139 are operated. When the aircraft, however, is located directly in front of the transmitter 107, the armature of the polarized relay 75 returns to normal position, interrupting its contact with the said upper contact. Relay 138 is then de-energized, but relay 139 remains operated, because it obtains holding current over its contact 1—2.

As soon as relay 138 is deenergized, motor 78 is short-circuited over the following circuit: Upper wire from motor 78, break contact of relay 140, make contact 8—9 of relay 139, break contact of relay 137, break contact of relay 138, make contact 5—6 of relay 139, break contact of relay 140, lower wire to motor 78. The motor 78 is thus short-circuited, whereby the said short-circuit in known manner acts as a brake on the motor, so that the motor stops.

While the relay 139 is operated its contacts 11—12 are closed, and the motor 54 is simultaneously started. As a result receivers 110 and 111, which together with transmitter 107 and receivers 108—109 performed a back and forth movement around the horizontal shaft 77 can now start hunting the target in vertical direction in the same manner as above described for shaft 76.

As soon as the aircraft is located in the center of the field of action of the receivers, the movement ceases and by means of the relays the device is caused to exactly follow the movements of the aircraft in similar manner as has been described in connection with Fig. 2.

Figure 4:
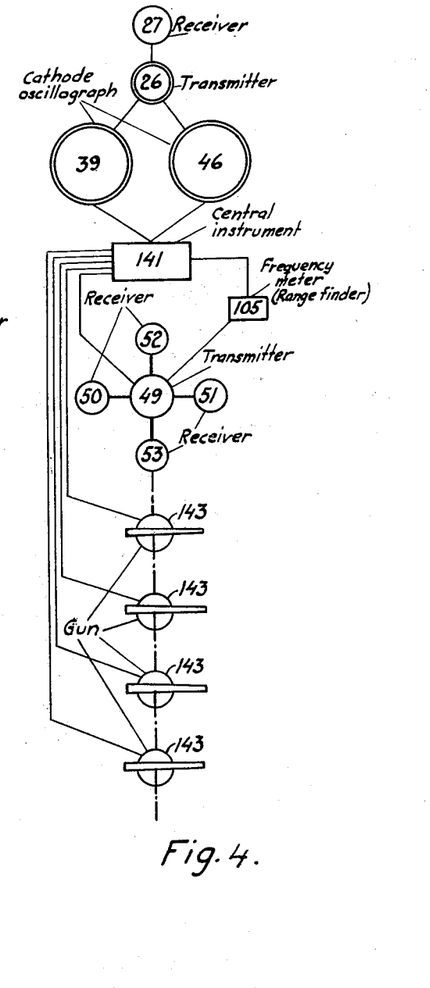
Fig. 4 is an abbreviated diagram showing a general fire control post and an individual target locating and following device according to Fig. 2 or Fig. 3.

In Fig. 4 elements 26 and 27 are transmitting and receiving means. Elements 39 and 46 are cathode ray tubes for general purposes as shown in Fig. 1. Element 141 is a central instrument for one or more batteries. 105 is a precision frequency meter, on which the range for the setting of the projectiles can be read. Elements 49–53 are transmitter and receivers respectively as shown in Fig. 2 for individual searching and following of the target. Elements 143 are antiaircraft guns, which are preferably in synchronism with the said individual searching and following devices. Correction of the line of departure of the projectiles from the respective guns in order to hit the target, compensation for wind, etc. is carried out in known manner.

In Fig. 5 elements 145 and 153 are two reflectors intended to collect ultrashort radio waves reflected from transmitter 49 in Fig. 2. Instead of four different receivers, as shown in Fig. 2, it is here proposed to use only one receiver 144 with a dipole or antenna 152. 146 and 155 are small reflectors placed in the foci of reflectors 145 and 153. From these foci received waves are reflected through holes 147 and 154 against reflecting screens 148 and 156, which are so located as to reflect the waves to the dipole 152. Element 150 is a metal disc provided with a hole 151. The disc is driven by a motor 149. Each time the hole of the disc passes, reflected waves from the reflecting screen 148 and 156 are allowed to act on the dipole 152 according to the wave energy received in the reflectors 145 and 153.

Figure 6:
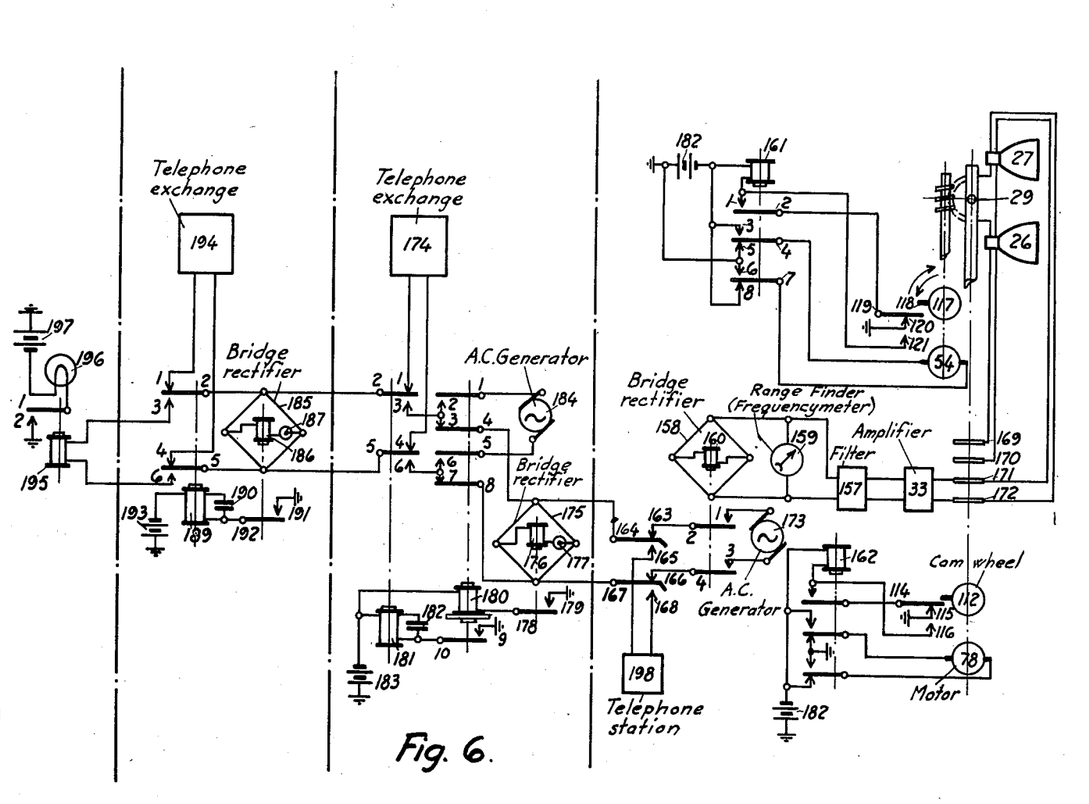
Fig. 6 is a variation of Fig. 1 for general locating of aircrafts and the transmission of alarm signals to a remote control central station as soon as an aircraft enters the range of the locator device, said alarm signals to be sent over existing lines, for example telephone lines without materially interrupting normal service over said lines.

Fig. 6 represents an embodiment of the invention according to which the searching or hunting device is utilized to immediately report to a district or other antiaircraft command the arrival of aircrafts within a certain defense zone. Elements 26 and 27 are respectively a transmitter and a receiver, which are horizontally and vertically movable as shown in Fig. 1.

The movements can be made continuous or oscillating as shown in Fig. 3. Movement in a vertical plane is obtained by means of cam wheel 117, contacts 119—121 and relay 161, while movement in a horizontal plane is produced by means of cam wheel 112, contacts 114—116 and relay 162. Element 33 is an amplifier and 157 is a highpass filter to eliminate disturbances that may be caused by flying birds within a range of, for example, 200 meters. Element 159 is a range finder, for example a frequency meter. 158 is a rectifying bridge device arranged in known manner. 160 is a relay to be operated by the rectified and amplified beat frequency current obtained in known manner between a transmitted and reflected wave. 173 is an alternating current source adapted to send signalling current over, for example, a telephone station line to the nearest central exchange 174. The voltage of the signal current source 173 is higher than that normally used on the telephone line. 175 is a rectifying device. 176 is a relay and 177 is a glow lamp valve to operate relay 176 only when a high voltage current from generator 173 is received.

Element 180 is a slowly acting relay and element 181 is a still more slow-acting relay provided with a condenser 182 for the special purpose later on to be described. Element 184 is a generator for producing an alternating voltage higher than that ordinarily used at the central station.

If the signal has to be relayed over still another (194) or several other central offices, an ordinary trunkline between said offices can be used for the purpose. In the same manner the signal can be relayed over any number of central offices without materially disturbing normal service as shown between offices 174 and 194.

In the central office 194 element 185 is a rectifying device. 186 is a relay and 187 is a glow lamp valve. 189 is a very slowacting relay including a condenser 190. 195 is a relay in the antiaircraft central command. 196 is a small lamp laced on a map of the region and corresponding to the center of the patrol zone of the locator device 26—27.

The device operates in the following manner. If while searching through the sky the frequency modulated waves emitted by the transmitter 26 encounter aircraft, waves are reflected and received by receiver 27. The waves are amplified in amplifier 33 and after passing through a high pass filter the current is rectified in rectifying device 158 and actuates relay 160, while at the same time the beat frequency and distance can be read or observed on frequency meter 159 or on a cathode ray tube as shown in Fig. 1.

Relay 160 upon being operated closes its contacts 1—2 and 3—4, whereby signal alternating current from generator 173 is transmitted over a telephone line connected to central office 174. In said office the signal is rectified in rectifying device 175 and the signal is received by relay 176 which is operated and closes its contacts 178—179. Relay 180 is thus operated and in its turn operates slowacting relay 181. When relays 180 and 181 are thus operated they disconnect the telephone line from its normal exchange connections and disconnect an outgoing trunkline to central office 194, while said trunkline is simultaneously disconnected from its normal central equipment. In these operations alternating signal current is impressed on said trunkline at central office 174 by means of generator 184. Said relayed signal current is rectified in central office 194 by rectifying device 185 and relay 186 operates, closing its contacts 191—192.

When said contacts are closed, slowacting relay 189 is operated, and while disconnecting the incoming trunk line from office 194 the said trunk line is directly connected to a junction line leading to the fire control command, where relay 195 is operated, lighting signal lamp 196 on a map.

In order not to disturb normal operation of telephone and trunk lines, glow lamp valves 177 and 187 at central offices 174 and 194, respectively, are connected in series with the respective relays 176 and 186.

If normal signalling current on said lines is, for example, 80 volts, the voltage of the special signal generators 173 and 184 is set at 120 volts. The valves 177 and 187 are set up as not to operate for the lower voltages, but as soon as the high voltage signal current is received relays 176 and 187 are operated during the time, when relay 160 is operated at the patrol station.

Inasmuch as direct connection between the patrol station and the fire control command is needed only during the short time that waves are reflected from the sky, that is for example every time when the locator device during its searching operations encounters an airplane in the sky, the normal telephone connections are very little disturbed.

In order to securely get a short signal relayed all the way to the fire control command over several central offices, slow acting relays 180 and 181 and 189 are connected to the circuits. Relay 180 disconnects the signalling current after a few seconds, if only a short impulse is originally transmitted. Relays 181 and 189, on the other hand act more slowly due to the condensers 182 and 190. Said relays can be arranged to disconnect after many seconds, depending upon the capacity of the condensers. This latter feature is convenient, if there is an observer at the patrol station, who has to verbally report to the fire command the direction and distance of the located aircrafts within the particular zone, or if the distance automatically should be transmitted from a range finder connected to the receiver and the transmitter.

In such a case the observer can press a switch button and connect a telephone 193 directly to the line for short verbal communication during an air raid. The relays 181 and 189 will then be operated a sufficiently long time to make short verbal reports, whereafter the lines are automatically restored to normal.

The high pass filter 157 can suitably be arranged to cut off all beat frequencies which correspond to distances shorter than, for example, 200 meters, so that the flight of birds and the like in front of the wave emitting device do not cause false alarm.

Figure 7:
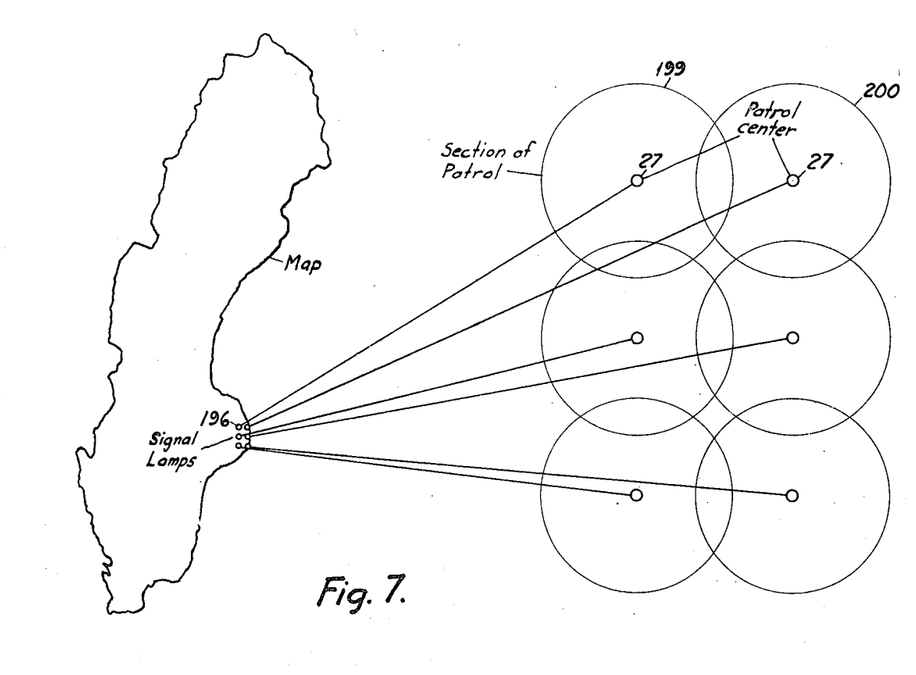
Fig. 7 is a diagram showing several fire control districts connected to the fire control central station, where a lamp signal is located at the exact spot of the map, that corresponds to the location of the particular locating device.

Fig. 7 shows a map with signal lamps 196 located at places corresponding to the locator centers 27' or automatic control devices as shown in Fig. 6. Each section of a fire control command can be provided with any number of such patrol centers, which, if desired, may overlap, so that a certain zone of the country is completely covered. If an aircraft tries to fly over said zone, a lamp will glow for each section which the aircraft passes so that the presence and the flight directions of the aircraft can be observed on the map at a glance.

Figure 8:
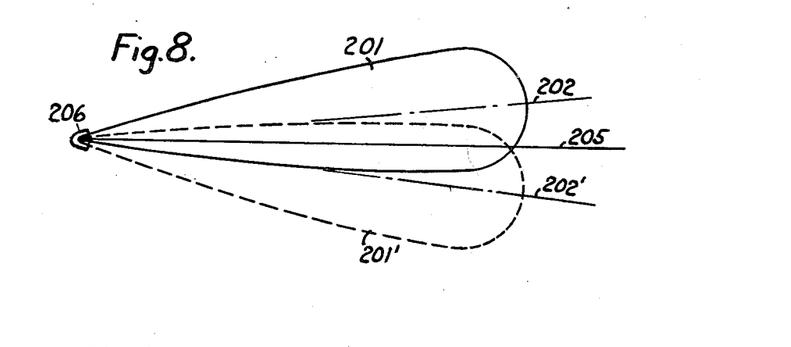
Fig. 8 shows diagrammatically the directional effect of a receiving antenna arranged in accordance with embodiments of the invention as shown in Figs. 2, 3 and 5, whereby an antenna lobe pattern scans in diverging directions.

In Fig. 8 there is shown an antenna lobe pattern 201 of sharp directional character belonging to receiving means and antenna device 206 adapted to scan in diverging directions 202 and 202' about a center line or center plane 205 and adapted successively to receive reflected radio energy from two substantially adjacent parts of a common field of search.

This scanning arrangement can be used in any of the embodiments shown in Figs. 2, 3 or 5.

Figure 9:
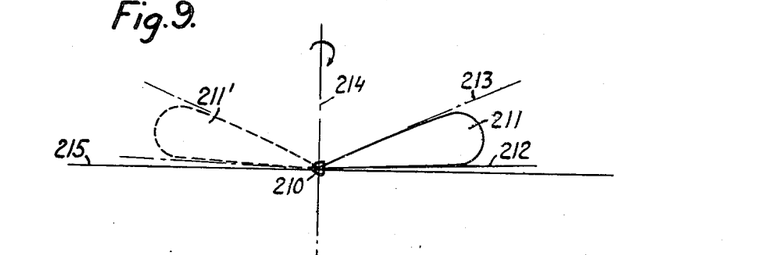
Figs. 9 and 10 diagrammatically show in side and plan views respectively a curtain-shaped antenna lobe pattern rotatable about a vertical axis.
Figure 10:
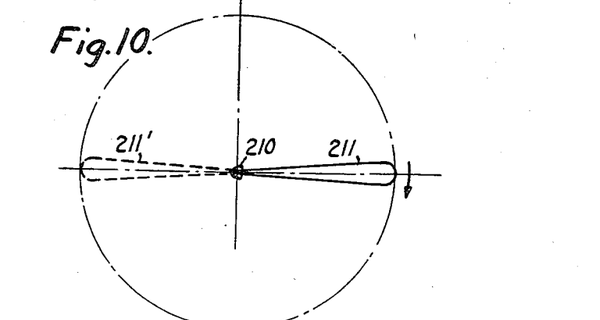

Figs. 9 and 10 show in side and plan views respectively, a narrow antenna lobe pattern or wave curtain 211 of a transmitter or receiver 210 rotatable about a vertical axis 214. The lowest part of the wave-curtain 211 forms an angle with the horizon or the horizontal plane 215, so that the upper 213 and the lower 212 limiting lines of the wave-curtain upon rotation may form surfaces of cones or parts thereof.

The dotted lobe 211' indicates the position of the wave curtain in its extreme left position, when rotating.

This scanning arrangement is a certain kind of conical scan and can particularly be used in the form of Fig. 3, in which the transmitter 197, or any of receivers 108 or 109 can take the place of the shown transmitter or receiver 210, although the said conical scanning arrangement can be used in the forms of any of Figs. 1-6.

What we claim is:

1. A scanning device for locating a target comprising directional antenna means for the transmission of radio energy in a certain direction and for the reception of reflected energy from about the same orientation as the transmitted radio energy, a support, means to rotate automatically said antenna means on said support about a first axis, means to rotate said antenna means automatically at a predetermined rate about a second axis perpendicular to said first axis, means alternatingly and successively to direct said reception antenna means into opposite sides of a reference plane passing through either of said first or second axis in order to receive energy from discrete and predetermined zones opposed in pairs on opposite sides of said reference plane and indicating means coupled to said antennas means and adapted successively to indicate on which side of said reference plane a target is substantially located.

2. A scanning device comprising directive antenna means adapted to scan a directive reception pattern, first scanning means operative on said antenna means to direct the axis of its reception pattern recurrently through a first predetermined path confined within a solid angle, second scanning means operative on said antenna means to direct the axis of its directive reception pattern recurrently through a second predetermined path confined within a second solid angle, and third scanning means operative on said antenna means alternating and successively to direct said axis into discrete and predetermined zones disposed in pairs on opposite sides of at least one reference plane.

3. Apparatus comprising an orientable device adapted to project and to receive a lobe of energy, first scanning means operative on said device to sweep said lobe recurrently through a spiral path, second scanning means operative on said device to sweep said lobe within a small circular cone, power means for actuating said scanners, indicating means coupled to said orientable device and adapted to indicate an echo from an object in the path of said projected lobe, and means for rendering one of said scanners inoperative upon the receipt of such an echo, while the other is operative.

4. A scanning device comprising a directive antenna adapted to project a lobe of radiant energy and power means for sweeping said lobe through a solid angle in space, and braking means responsive to energy reflected from an irradiated object for stopping the motion of said lobe when said lobe is directed substantially on said object.

5. A scanning device comprising directive antenna means adapted to receive a lobe of radiant energy, first scanning means adapted to sweep said lobe through successive portions of a solid angle in space, second scaning means operative when said first scaning means is inoperative, to sweep said lobe through a narrow zone of said solid angle, and control means responsive to radiant energy reflected from a scanned object adapted to render said first scanning means inoperative.

6. A scanning device comprising a first and a second directive antenna means adapted to scan a first and a second directive reception patterns, first scanning means adapted to sweep said lobe through successive portions of a solid angle in space, second scanning means operative when said first scanning means is inoperative, to sweep said second directive antenna means through a narrow zone of said solid angle, and control means responsive to radiant energy reflected from a scanned object and adapted to render said first scanning means inoperative while the second scanning means is operative.

7. In combination, a plurality of ground-based radars, each one in a separate zone for detecting the presence of a foreign body within the corresponding zone, each radar comprising directive antenna means for projecting and for receiving a lobe of radiant energy in a direction between horizon and zenith, scanning means operative on said directive antenna means to sweep said lobe about a vertical axis, power means for actuating said scanner, a receiver coupled to said antenna means for receiving an echo from an object in the path of said projected lobe, a central station remote from said zones, a map at said central station, indicators on said map in exact geographical positions corresponding to the positions of said ground radars in the field, a channel of communication between each receiver and its corresponding indicator on the map for the operation of said indicator upon the receipt of an echo from an object within the corresponding ground radar.

8. A scanning device comprising directing antenna means adapted to radiate and to receive a fan-shaped lobe of radiant energy, an axis about which said antenna means is rotatable, scanning means operative on said antenna means to sweep said lobe recurrently in a circular path about said axis, said fan-shaped lobe having its greatest extension in its center plane substantially parallel with the said axis, and a braking device responsive to energy reflected from an irradiated object for stopping the motion of the lobe, when said object is encountered within said fan-shaped lobe.

9. A scanning device comprising a first directive antenna means adapted to radiate and to receive a lobe of radiant energy in the shape of a curtain, a first axis about which said first directive antenna means is rotatable, first scanning means operative on said first directive antenna means to sweep said curtain-shaped lobe in a circular path about said axis, said curtain-shaped lobe having its greatest extension in its center plane substantially parallel with a plane passing through the said first axis, a braking device responsive to energy reflected from an irradiated object to stop the operation of said first scanning means when said object is encountered on the said center plane of said curtain-shaped lobe, a second directive antenna means adapted to receive a lobe of small extension in a plane at right angles to the said curtain-shaped lobe, a second axis at right angles to the said first axis and about which said second directive antenna means is rotatable, second scanning means operative on said second directive antenna means for sweeping said second lobe about said second axis, until the said object is encountered in a plane substantially parallel with a plane passing through said second axis and through said second lobe.

10. A scanning device comprising directive antenna means adapted to radiate and to receive a fan-shaped lobe of radiant energy, a vertical axis about which said antenna means is rotatable, the antenna means being so attached to the said vertical axis that the said lobe has its greatest extension in its center plane substantially parallel with the said axis, power means operative on said device to sweep said lobe recurrently in a circular path about said axis, a receiving system comprising a cathode ray tube coupled to said antenna means, a range finder coupled between said antenna means and said cathode ray tube, synchronizing means for driving the cathode ray of said cathode ray tube synchronously with the directive antenna means for indication on the screen of said cathode ray tube of direction and distance of an object as a light spot in the moment, when the cathode ray is deviated from its normal position in the direction of said object at a distance from the normal position of the ray on said screen corresponding to the distance of said object when said object is irradiated by said radiant lobe.

11. A scanning device comprising directive antenna means adapted to radiate and to receive a directed lobe of radiant energy, a first axis about which said antenna means is rotatable in a certain plane, first scanning means operative on said antenna means to sweep said lobe recurrently in a path about said first axis, a second axis at right angles to the said first axis and about which second axis the antenna means is rotatable, second scanning means operative on said antenna means to sweep said lobe recurrently in a plane at right angles to the said first mentioned plane, and a receiving system comprising two cathode ray tubes coupled to said antenna means, and synchronizing means for moving the cathode rays of said cathode ray tube synchronously with the said antenna means for indication on the screens of said cathode ray tubes distances, side- and elevation-angles to objects in polar coordinates, when echos are received from said objects upon being encountered by said lobe.

12. A scanning device for projecting and receiving a lobe of ultra-short radio waves comprising directive antenna means in the shape of a paraboloid, in the focus of which a dipole is located, a magnetron tube transmitter and a receiver connectable to said directive antenna means for transmitting and receiving ultra-short radio waves, first scanning means operative on said antenna means to direct the axis of its reception pattern recurrently through a first predetermined path confined within a solid angle, second scanning device operative on said antenna means to direct the axis of its directive reception pattern recurrently through a second predetermined path confined within a second solid angle, and third scanning means operative on said antenna means alternatingly and successively to direct said axis into discrete and predetermined zones disposed in pairs on opposite sides of at least one reference plane.

13. A scanning device for locating a target comprising directional antenna means for the transmission of radio energy in a certain direction and for the reception of reflected energy from about the same orientation as the transmitted energy, a support, means for pivotally mounting said antenna means on said support for oscillation about a first axis, means for rotating said support at a predetermined rate about a second axis perpendicular to said first axis, said antenna means adapted alternatingly to receive reflected energy from discrete and predetermined zones disposed in pairs on opposite sides of a reference plane, and indicating means coupled to said antenna means and adapted successively to indicate on which side of said reference plane a target is substantially located, and an amplifier interconnected between said antenna means and said indicating means for amplifying reflected energy from either of said zones on opposite sides of said reference plane.

14. A scanning device comprising directive antenna means adapted to scan a directive reception pattern, first scanning means operative on said antenna means to direct the axis of its reception pattern recurrently through a first predetermined path confined within a solid angle, second scanning means operative on said antenna means to direct the axis of its directive reception pattern recurrently through a second predetermined path confined within a second solid angle, and third scanning means operative on said antenna means alternatingly and successively to direct said axis into discrete and predetermined zones disposed in pairs on opposite sides of a reference plane, whereby the third scanning means is operative on said antenna means at a rate substantially faster than that of either of the first and second scanning means.

HELGE FABIAN ROST.
KARL HARRY THUNELL.
STEN DANIEL VIGREN.
PER HARRY ELIAS CLAESSON.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,083,242 | Runge | June 8, 1937 |
| 2,151,549 | Becker | Mar. 21, 1939 |
| 2,165,800 | Koch | July 11, 1939 |
| 2,171,293 | Plastino | Aug. 29, 1939 |
| 2,176,469 | Moueix | Oct. 17, 1939 |
| 2,207,267 | Plaistowe | July 9, 1940 |
| 2,231,929 | Lyman | Feb. 18, 1941 |
| 2,267,715 | Bowen | Dec. 30, 1941 |
| 2,399,426 | Bradley | Apr. 30, 1946 |
| 2,409,448 | Rost | Oct. 15, 1946 |
| 2,412,612 | Godet | Dec. 17, 1946 |
| 2,412,631 | Rice | Dec. 17, 1946 |
| 2,412,702 | Wolff | Dec. 17, 1946 |
| 2,446,024 | Porter et al. | July 27, 1948 |
| 2,506,617 | Sackville | May 9, 1950 |
| 2,514,351 | Smith | July 4, 1950 |

FOREIGN PATENTS

| Number | Country | Date |
|---|---|---|
| 813,404 | France | Feb. 22, 1937 |